US009699797B2

(12) United States Patent
Rommer et al.

(10) Patent No.: US 9,699,797 B2
(45) Date of Patent: Jul. 4, 2017

(54) ACCESS FEEDBACK BY A MULTIMODE TERMINAL

(71) Applicant: Telefonaktiebolaget L M Ericsson (PUBL), Stockholm (SE)

(72) Inventors: Stefan Rommer, Västra Frölunda (SE); Dirk Kopplin, Ytterby (SE); Hans Rönneke, Kungsbacka (SE); John Stenfelt, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/886,972

(22) Filed: Oct. 19, 2015

(65) Prior Publication Data
US 2016/0183273 A1 Jun. 23, 2016

Related U.S. Application Data

(63) Continuation of application No. 13/638,565, filed as application No. PCT/EP2010/054354 on Mar. 31, 2010, now Pat. No. 9,167,481.

(51) Int. Cl.
*H04W 80/04* (2009.01)
*H04W 88/06* (2009.01)
(Continued)

(52) U.S. Cl.
CPC ......... *H04W 72/087* (2013.01); *H04M 15/66* (2013.01); *H04W 28/0226* (2013.01);
(Continued)

(58) Field of Classification Search
CPC H04W 80/04; H04W 88/06; H04L 29/06027; H04L 12/6418; H04L 2012/563; H04L 12/5695
(Continued)

(56) References Cited

U.S. PATENT DOCUMENTS 8,493,938 B2 7/2013 Yu
2002/0085511 A1 7/2002 Koponen et al.
(Continued)

FOREIGN PATENT DOCUMENTS

EP 2 012 473 A1 1/2009
FI EP 2012473 * 7/2007 ............. H04L 12/56
(Continued)

OTHER PUBLICATIONS

International Search Report and the Written Opinion of the International Searching Authority dated Jan. 3, 2011, in International Application No. PCT/EP2010/054354, 11 pages.
(Continued)

*Primary Examiner* — Ronald B Abelson
(74) *Attorney, Agent, or Firm* — Rothwell, Figg, Ernst & Manbeck, P.C.

(57) ABSTRACT

A method for providing access feedback when a User Equipment, UE, with an established a connection over multiple accesses towards a Gateway, GW, initiates a set-up of a new service for a service session. The method comprises a step where the GW or a Policy and Charging Rules Function, PCRF, initiates a Quality of Service, QoS, resource reservation as a response of the set-up of the new service initiated by the UE. The GW or the PCRF in the QoS resource reservation selects a first access as present access. The method is particularly characterized in a step where the UE rejects said first access as present access and sends a reject message to the GW, wherein the GW or the PCRF as a result of the reject message initiates a new QoS resource reservation selecting a second access as present access.

13 Claims, 5 Drawing Sheets

(51) Int. Cl.
    *H04L 29/06*     (2006.01)
    *H04L 12/64*     (2006.01)
    *H04L 12/70*     (2013.01)
    *H04L 12/54*     (2013.01)
    *H04W 72/08*     (2009.01)
    *H04W 76/02*     (2009.01)
    *H04M 15/00*     (2006.01)
    *H04W 72/04*     (2009.01)
    *H04W 28/02*     (2009.01)

(52) U.S. Cl.
    CPC ..... *H04W 72/0453* (2013.01); *H04W 76/025* (2013.01); *H04W 76/027* (2013.01)

(58) Field of Classification Search
    USPC ................. 370/328, 352, 353, 395.2, 395.21
    See application file for complete search history.

(56) References Cited

U.S. PATENT DOCUMENTS

2005/0083899 A1     4/2005    Babbar et al.
2008/0205344 A1     8/2008    Lee et al.
2010/0015979 A1     1/2010    Kono
2010/0182912 A1*   7/2010    Hongisto ............ H04L 12/5695
                                                                370/242
2010/0309843 A1    12/2010   Mahendran et al.

FOREIGN PATENT DOCUMENTS

JP        2007-150706 A     6/2007
WO       2008083533 A1     7/2008
WO       2009089704 A1     7/2009

OTHER PUBLICATIONS

LG Electronics, "Clarification on Addition of an access to a PDN connection" 3GPP TSG SA WG2 Meeting #77, TD S2-100297, 3rd Generation Partnership Project (3GPP), Jan. 18-22, 2010, XP050432870, 5 pages.

3GPP TS 23.261 V1.0.0 (Mar. 2010) 3rd General Partnership Project; Technical Specification Group Services and System Aspects; IP Flow Mobility and seamless WLAN offload; Stage 2 (Release 10), XP050401978, 20 pages.

European Communication dated Feb. 9, 2016, issued in European Patent Application No. 110715760.4, 4 pages.

* cited by examiner

ACCESS FEEDBACK BY A MULTIMODE TERMINAL

CROSS REFERENCE TO RELATED APPLICATION(S)

This application is a continuation of U.S. application Ser. No. 13/638,565, filed Sep. 28, 2012, which is a 35 U.S.C. §371 National Phase Entry Application from PCT/EP2010/054354, filed Mar. 31, 2010, designating the United States, the disclosures of each of the above-referenced applications are incorporated herein in their entirety by reference.

TECHNICAL FIELD

The present invention relates to a method for providing access feedback. It also relates to a Gateway and a User Equipment adapted for the same purpose.

BACKGROUND

The scenario where a terminal (UE/MS) can get access via a number of different access technologies is becoming more and more common. For example, mobile phones often come equipped with both cellular and WLAN (Wireless Local Area Network) access capabilities. Laptops often have Ethernet, WLAN and sometimes also cellular access capabilities. These different interfaces may be used one at a time or they may be activated simultaneously. However, more importantly, in the current solution a given service or a given IP session is typically only using one access at a time.

Currently 3GPP EPS—Evolved Packet System (also known as 3GPP SAE—System Architecture Evolution) is defining solutions for how session continuity can be achieved when a UE (User Equipment) moves between different accesses. This can e.g. mean that a service that is running over a cellular access is moved to run over a WLAN access instead. But also with this solution, the UE is only using one access at a time and during an access change, the whole IP session and all running services within that IP session is moved from source access to target access. Simultaneous use of multiple accesses (a.k.a. multi-homing) is not supported, except for very short times during a handover between two accesses.

There is work ongoing in IETF (Internet Engineering Task Force), and related work being started up in 3GPP, for defining mobility solutions in multi-homing scenarios. As part of this work the concept of "flow mobility" is investigated, i.e. only a subset of the IP flows for a given IP session is moved from one access to another. For example, it could be that only the video component of a multimedia call is moved from cellular access to WLAN, while the IP flows related to the voice component of the same call stays in cellular access. One IP session would thus be active over multiple accesses simultaneously.

One solution proposed in 3GPP work on simultaneous multi-access (called MAPIM—Multi Access PDN connectivity and IP flow Mobility—in 3GPP) is that it is the UE that is controlling the flow mobility. This means that the UE activates each access (e.g. 3GPP access and WLAN) and decides which IP flows are transported over each access. The UE also selects a default access out of the available accesses. IP flows that have not been explicitly assigned a specific access are carried over the default access. The network may choose to accept a reject a request from the UE, but not initiate a handover procedure.

This UE-centric control of IP-flow mobility is a key principle of the solution and is in fact an extension of the inter-access mobility defined for 3GPP SAE in release 8. In release 8 it is always the UE that triggers a handover between two different accesses. One reason for this is that the UE is the only entity in the network aware of e.g. signal quality of different accesses technologies. Also, a UE-triggered handover procedure avoids the need for interactions between heterogeneous access networks. Network-triggered handover procedures, i.e. procedures where the network initiates the handover, are only defined between certain "tightly coupled" accesses such as GERAN (GSM Edge Radio Access Network), UTRAN (UMTS Terrestial Radio Access Network) and E-UTRAN (Evolved UTRAN).

The UE may use multiple criteria for choosing which access that shall carry certain IP flows. First of all the UE has access selection policies (either pre-configured in the UE or received over-the-air from the network operator). The policies may contain a prioritized list of accesses to be uses for certain services. Then the UE also has information about the signal quality, characteristics, throughput etc of the different available accesses.

One problem occurs when the UE-centric mobility paradigm for IP flow mobility is combined with network-initiated QoS procedures. When only a single access is active (as in release 8) there is no issue since the network has no choice when establishing new QoS resources using the network initiated procedures. However, when multiple accesses are available simultaneously, the network in principle has a choice between the different access technologies. According to the UE-centric mobility paradigm, it is however always the UE that decides which access to use for a certain IP flow. The current solution in the UE-centric mobility paradigm is that network sets up network-initiated QoS resources for new IP flows on the default access. It is then up to the UE if it wants to trigger a mobility procedure afterwards to move the new IP flow to another access.

There are several drawbacks with this approach. First of all it results in an inefficient service establishment procedure for services that use network-initiated QoS (Quality of Service) procedures. The network must always establish the QoS resources in the default access first and then the UE can move the resources to a more suitable access later (e.g. based on the access selection policies). The move of an IP flow for a service requires the NW to establish the corresponding resources in the new access and tear down the resources in the old access.

Furthermore, it may also result in a non-optimal service experience since the service may be initiated in a non-optimal access before it can be moved (by the UE) to a more optimal access with e.g. higher bit rate capacity and/or better QoS capabilities. The current state of the art is illustrated in FIG. 2. The figure will not be described in detail in the present patent application. More information about this signaling flow procedure can be found in 3GPP technical specifications TS 23.401, TS 23.402, TS 23.203 and TS 23.261.

One solution to this problem could be that the network initiates the QoS procedures in the "best" access directly, instead of in the default access. This however breaks the UE-centric mobility paradigm. Another problem is that the network nodes initiating the QoS procedures do not have access to the access selection policies since such policies are stored in the Access Network Discovery and Selection Function (ANDSF). The network nodes therefore do not know which access is the "best" access. A third drawback is that network-based access selection and network-triggered inter-access handover makes the heterogeneous accesses more tightly coupled. Coupling heterogeneous accesses is non-trivial since each access typically has different solutions to key aspects such as security, mobility, etc.

SUMMARY

The object of the present invention is therefore to ensure that QoS resources for an IP flow or service are established in the desired access during handover in a multi access environment.

In object of the present invention is solved by means of a method for providing access feedback when a User Equipment, UE, with an established a connection over multiple accesses towards a Gateway, GW, initiates a set-up of a new service for a service session. The method comprises a step where the GW or a Policy and Charging Rules Function, PCRF, initiates a Quality of Service, QoS, resource reservation as a response of the set-up of the new service initiated by the UE. The GW or the PCRF in the QoS resource reservation selects a first access as present access.

The method is particularly characterized in a step where the UE rejects said first access as present access and sends a reject message to the GW, wherein the GW or the PCRF as a result of the reject message initiates a new QoS resource reservation selecting a second access as present access.

The object of the present invention is also solved by means of a User Equipment, UE, with an established connection over multiple accesses. The UE is adapted to provide access feedback to a GW when the UE initiates a set-up of a new service for a service session. The UE is particularly characterized in that it is adapted to reject a selected first access as present access and send a reject message to a GW. The first access is selected in a Quality of Service, QoS, resource reservation initiated by the GW or a Policy and Charging Rules Function, PCRF as a response of a service session initiated by the UE.

The object of the present invention is also solved by means of a Gateway, GW, being adapted for initiating a Quality of Service, QoS, resource reservation as a response of the set-up of a new service initiated by the UE according to claim 11. The GW in the QoS resource reservation being adapted to select an access as present access. The GW is particularly characterized in that it is further adapted to initiate a new QoS resource reservation as a result of the reject message sent by the UE, and select a second access as present access.

The object of the present invention is finally solved by means of a Policy and Charging Rules Function (13), PCRF, being adapted for initiating a Quality of Service, QoS, resource reservation as a response of the set-up of a new service initiated by the UE according to claim 11. The PCRF in the QoS resource reservation being adapted to select an access as present access. The PCRF is particularly characterized in that it is further adapted to initiate a new QoS resource reservation as a result of the reject message sent by the UE, and select a second access as present access.

The main advantage of the invention is that the network can ensure that QoS resources for an IP flow are established in the desired (present) access immediately, without going through the intermediate step of setting up the resources in a default access first and then let the UE trigger a movement of IP flow to the desired access. This has several advantages:

It reduces the load on the access networks since QoS reservation only happens once (in desired access) instead of twice (first in default access and then in desired access)

Service experience is improved since the service starts rapidly in desired access instead of starting up in a default access and then gets moved to the desired access.

Reduced risk of service loss in case the service is rejected completely in default access before the UE gets a chance to move it to desired access.

No need to introduce NW-based access selection or NW-triggered inter-access mobility procedures.

Further advantages are achieved by implementing one or several of the features of the dependent claims. This will be further explained below.

BRIEF DESCRIPTION OF THE DRAWINGS

The invention will be described in greater detail in the following, with reference to the examples that are shown in the attached drawings, in which.

DETAILED DESCRIPTION

The embodiments of the invention with further developments described in the following are to be regarded only as examples and are in no way to limit the scope of the protection provided by the patent claims.

The present invention relates to a method for providing access feedback. It also relates to a Gateway and a User Equipment adapted for the same purpose. Even though the detailed description describes the method performed by these functions, the person skilled in the art realizes that these functions, which are adapted to perform these method steps, are also disclosed in the description.

Figure 1:
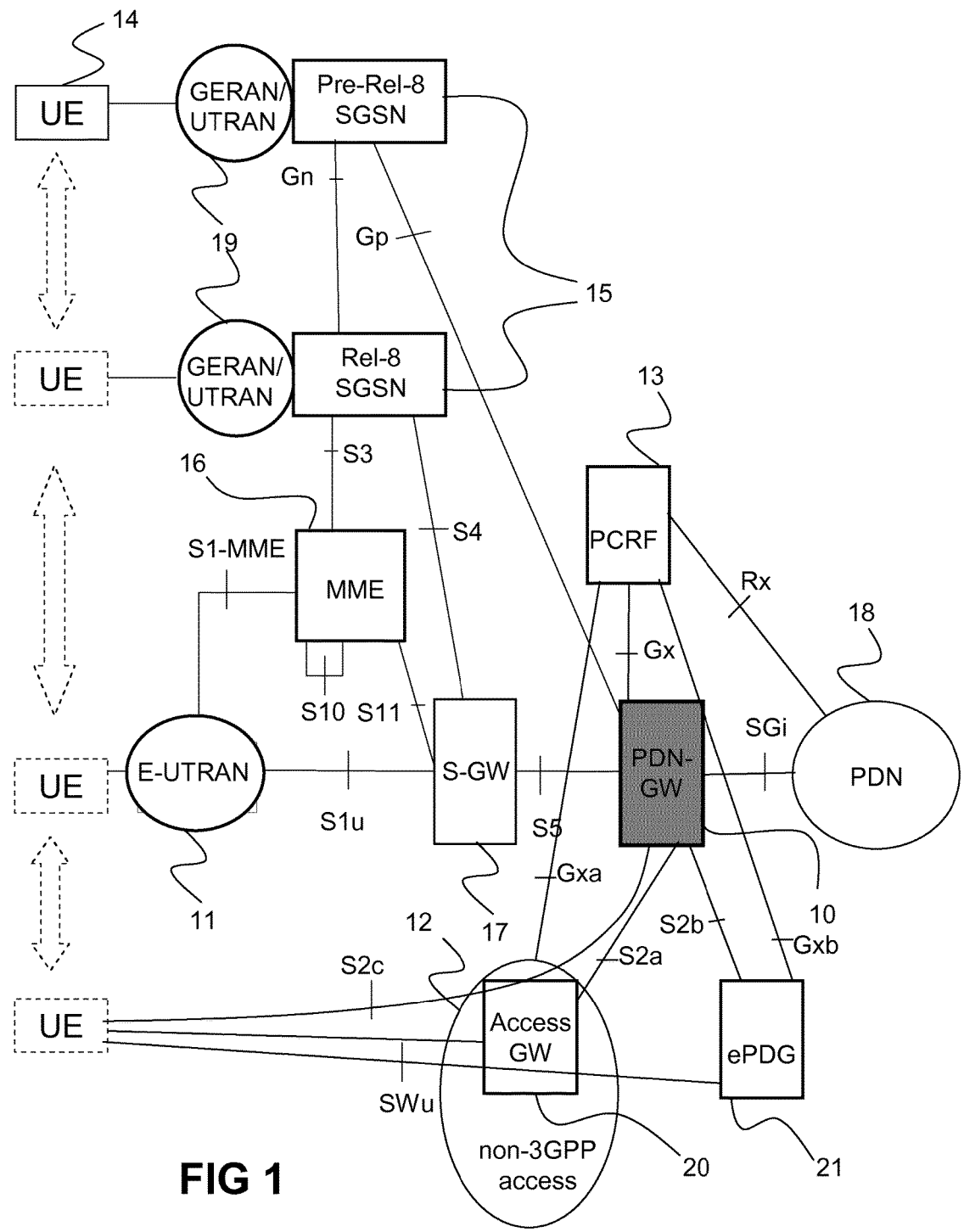
FIG. 1 illustrates a network with multi accesses.
Figure 2:
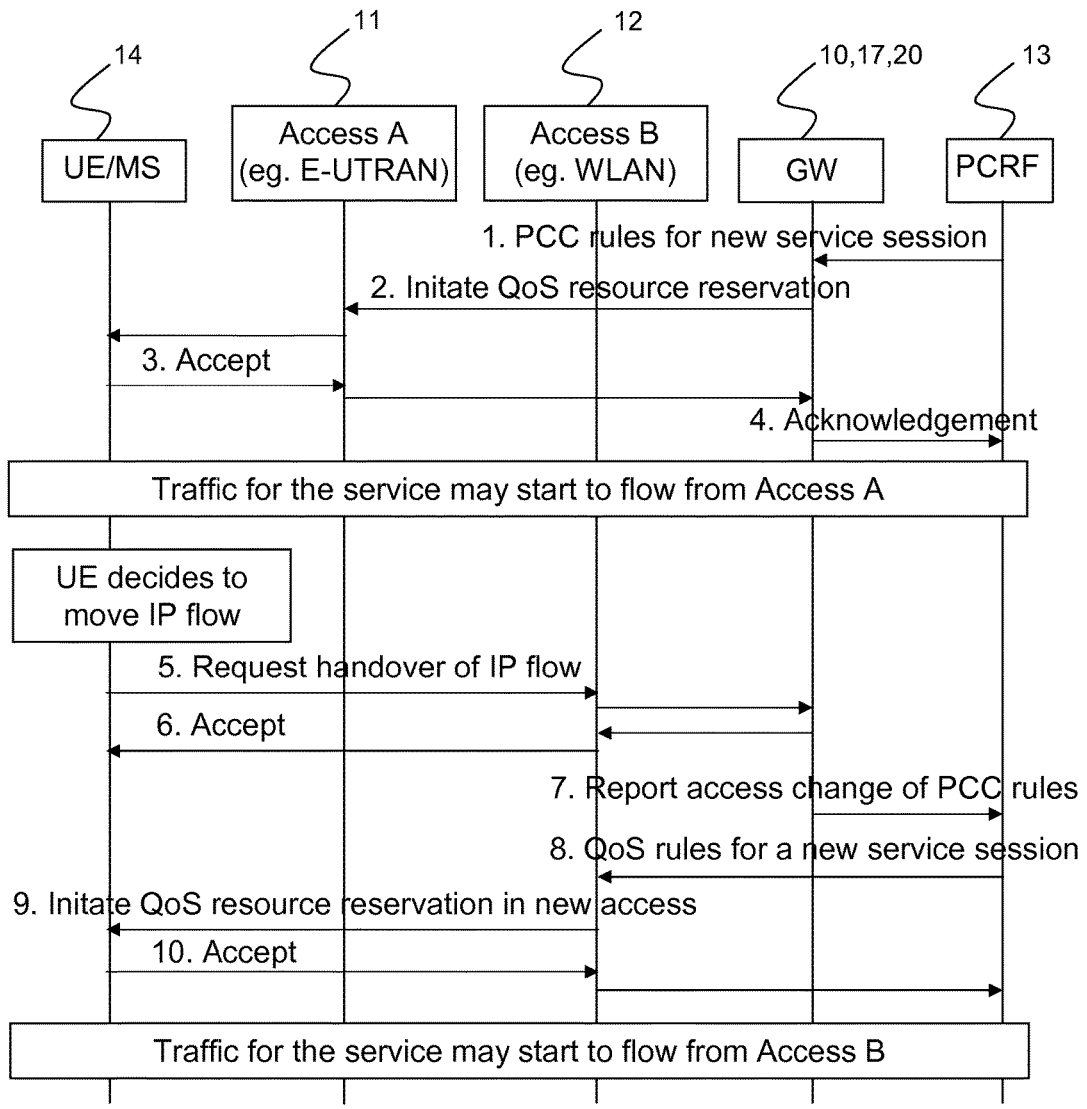
FIG. 2 illustrates a known network signaling diagram for handover in a multi-access environment.

FIG. 1 shows a network into which the present invention is preferably implemented. FIG. 1 shows a System Architecture Evolution (SAE) core network. Components of the network communicate with each other via reference points and interfaces (Gn, Gp, S3, S4, S10, S11, S1u, S5, Gxa, Gxb, Gxc, Gx, Rx, S2a, S2b, S2c, SGi), which will not be described more in detail here. Some components of the SAE core network are a Mobility Management Entity (MME) 16, a Serving Gateway (S-GW) 17, non-3GPP Access GW 20, evolved Packet Data Gateway (ePDG) 21 and a Packet Data Network Gateway (PDN-GW) 10.

The MME 16 is responsible for controlling an E-UTRAN Radio Access Network (RAN) 11, and selecting S-GW 17 for a User Equipment, UE, 14. From now on all RAN's will be named "access". MME also provides the control plane function for mobility between the E-UTRAN access and GERAN/UTRAN accesses 19, which are divided into pre-rel-8 and rel-8 GERAN/UTRAN. The S-GW routes and forwards IP flows for particular services. It also acts as mobility anchor for mobility between the E-UTRAN and GERAN/UTRAN. The Serving GPRS Support Node (SGSN) 15 can in GPRS core networks for instance be used for routing and forwarding IP flow from and to the UE 14. It is in SAE connected to MME and the S-GW. Today there is an option for the user plane data to bypass the SGSN. When this option is used, the SGSN is only a control plane entity and does not route or forward user data. The ePDG routes packets between UE and PDN-GW and supports IPSec functionality for protection IP packets between UE and ePDG.

The PDN-GW 10 provides connectivity between the UE 14 and external Packet Data Networks (PDN) 18 by being the point of exit and entry of traffic for the UE. An UE may have simultaneous connectivity with more than one PDN-GW 10 for accessing multiple PDN's. A key role of the PDN-GW is to act as the anchor for mobility between 3GPP and non-3GPP technologies such as WiMAX, WLAN and 3GPP2. Non-3GPP technologies are in the following also embraced by the term "access".

A Policy and Charging Rules Function 13, PCRF, controls a PCEF in the PDN-GW 10 by providing PCC rules via the Gx reference point. The PCC rules decision in the PCRF may be based on information obtained by the PCEF via the Gx reference point. The PCRF can by changing the PCC rules control the accesses on a PDP context basis, see FIG. 1, for the UE.

Depending on architecture option used, the PCRF may in addition to the controlling of the PCEF also control a Bearer Binding and Event Reporting Function (BBERF) by providing Quality of Service (QoS) rules via the Gxa, Gxb or Gxc reference points. The BBERF may be located in the Serving GW 17 and/or an Access GW in the non-3GPP access 12. The architecture option with BBERF in addition to PCEF is used when the mobility protocol between Serving GW 17 (or Access GW 20 in non-3GPP access) and PDN-GW do not support QoS signaling. For more details, see 3GPP TS 23.203. This will be described more in detail in the following.

A main problem with present multi-homing scenarios it that a service may be initiated in a non-optimal access before it can be moved (by the UE) to a more optimal access with, e.g. higher bit rate capacity and/or better QoS capabilities. It is therefore important to ensure that QoS resources for an IP flow are established in the desired (present) access immediately, without going through the intermediate step of setting up the resources in a default access first and then let the UE trigger a movement of IP flow to the desired access.

In order to enable such an improved establishment procedure, the present invention comprises certain steps that are performed to provide access feedback when the UE 14 has established a connection over multiple accesses towards a Gateway, GW, initiates a set-up of a new service for a service session. A service is for instance telephony or audio/video streaming between the UE 14 and the PDN 18.

Figure 5:
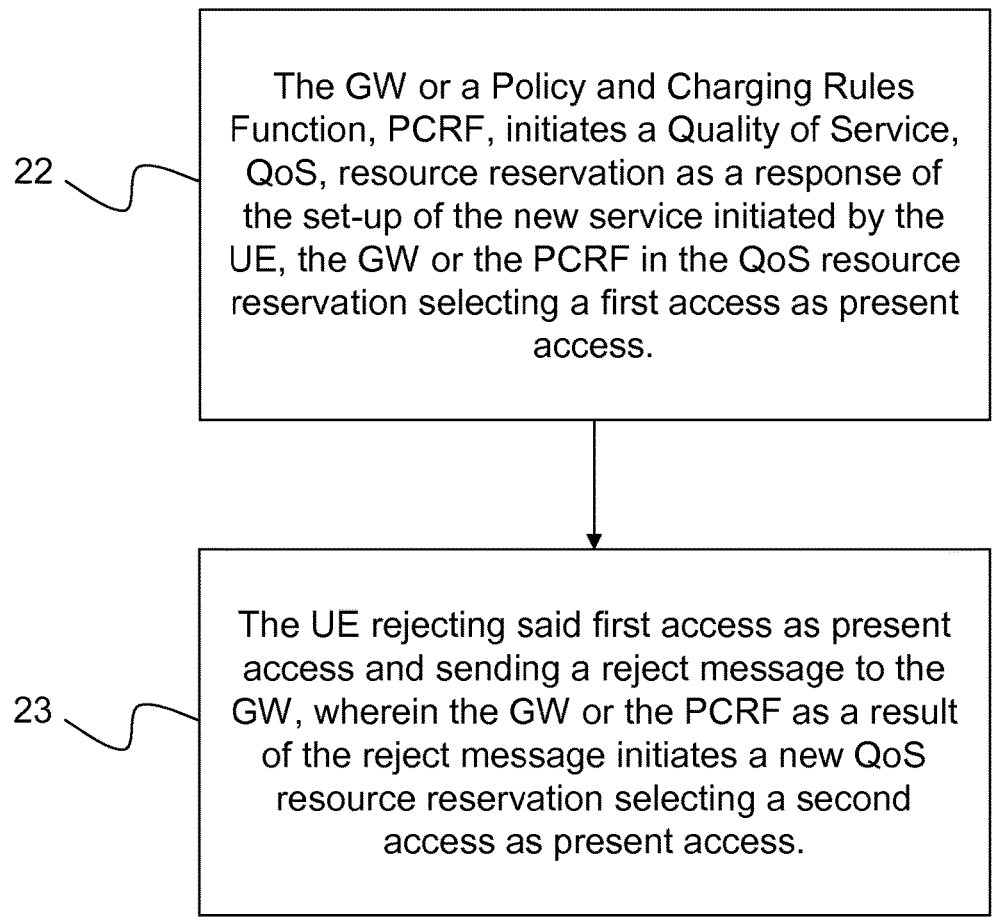
FIG. 5 illustrates a flow scheme for the method according to the present invention.

1. In a first step 22, see FIG. 5, the GW 10,17,20 or the PCRF 13 initiates a Quality of Service, QoS, resource reservation as a response of the set-up of the new service initiated by the UE 14. The GW selects a first access 11,12,19 as present access in the QoS resource reservation.
2. In a second, inventive step 23, see FIG. 5, the UE 14 rejects said first access 11,12,19 as present access and sends a reject message to the GW 10,17,20. The GW or the PCRF 13 as a result of the reject message initiates a new QoS resource reservation selecting a second access 11,12,19 as present access.

The GW refers to one of PDN-GW 10, Serving GW 17 or Access GW 20. Which of the GW's are meant depend on the architecture option being used, i.e. whether a BBERF exist or not.

The fact that the reject message is sent to the GW 10,17,20 also embraces a scenario where the reject message is included in a new message, sent from the GW to the PCRF 13. In such a scenario the GW consequently forwards the message in a new form to the PCRF. This means that in case the PCRF initiates a new resource reservation, the reject message is able to reach the PCRF.

The fact that either the GW 10,17,20 or the PCRF 13 initiate a new resource reservation relates to the presence of a BBERF. Depending on architecture option used, the PCRF may in addition to the controlling of the PCEF also control a Bearer Binding and Event Reporting Function (BBERF) by providing Quality of Service (QoS) rules via the Gxa, Gxb or Gxc reference points. The BBERF may be located in the Serving GW 17 and/or an Access GW in the non-3GPP access 12. Consequently, if a BBERF is present, QoS resource reservation is initiated by the PCRF. If the BBERF is not present, resource reservation is initiated by the GW.

This means that when the network (the PCRF 13) initiates QoS procedures towards the UE 14 over an (default) access, it is proposed that the UE can make a "partial reject" of the request from the GW 10,17,20 or the PCRF 13 and return this reject to the GW (which may forward it to the PCRF). It is a "partial reject" since it is not a complete rejection of the request but rather an indication that the service should not be established in this access.

The fact that the UE 14 sends a reject message results in that the load is reduced on the accesses 11,12,19 since QoS reservation only happens once (in desired access) instead of twice (first in default access and then in desired access). Service experience is improved since the service starts rapidly in desired access instead of starting up in a default access and then gets moved to the desired access.

The fact that the GW 10,17,20 or PCRF 13 selects a first or a second access means that the GW or PCRF may, based on information from the UE 14, select an access. The UE then provides the possible accesses to be selected and the GW or PCRF chooses one of these provided accesses as selected access. For instance, when the first access is selected as present access, this is not really a selection since the first access has already been selected by the UE 14. An alternative is that the GW or PCRF by itself chooses an access, without any information provided by the UE.

When the UE 14 accepts said second access as present access and sends an accept message to the GW 10,17,20, the GW or the PCRF as a result of the accept message proceeds with the initiated QoS resource reservation over the selected and accepted access. The UE furthermore, as a result of the accept initiates a flow mobility procedure by sending a IP flow mobility message to the GW for the established service or IP session flow via the selected, present access.

The fact that the accept message and the flow mobility message is sent to the GW 10,17,20 also embraces a scenario where these messages are included in a new message, sent from the GW to the PCRF 13.

The UE 14 is preferably informed about the first access selected in an access selection message in the QoS resource reservation. This access selection message may comprise information of the capability of the GW 10,17,20 or PCRF 13 to receive a reject message.

As mentioned, the UE may inform in the reject message about possible accesses to be selected. The reject message then comprises access information indicating which at least one second access that is selectable by the GW 10,17,20 or PCRF 13 as present access. These second accesses are used instead of the first access for the access selection by the GW or PCRF. The access information is returned by the UE 14 as access selection policies. The access information consists in a list of at least one second access, said list being sorted in priority order. This access information is a very suitable way to ensure that the GW or PCRF selects an access desired by the UE.

Figure 3:
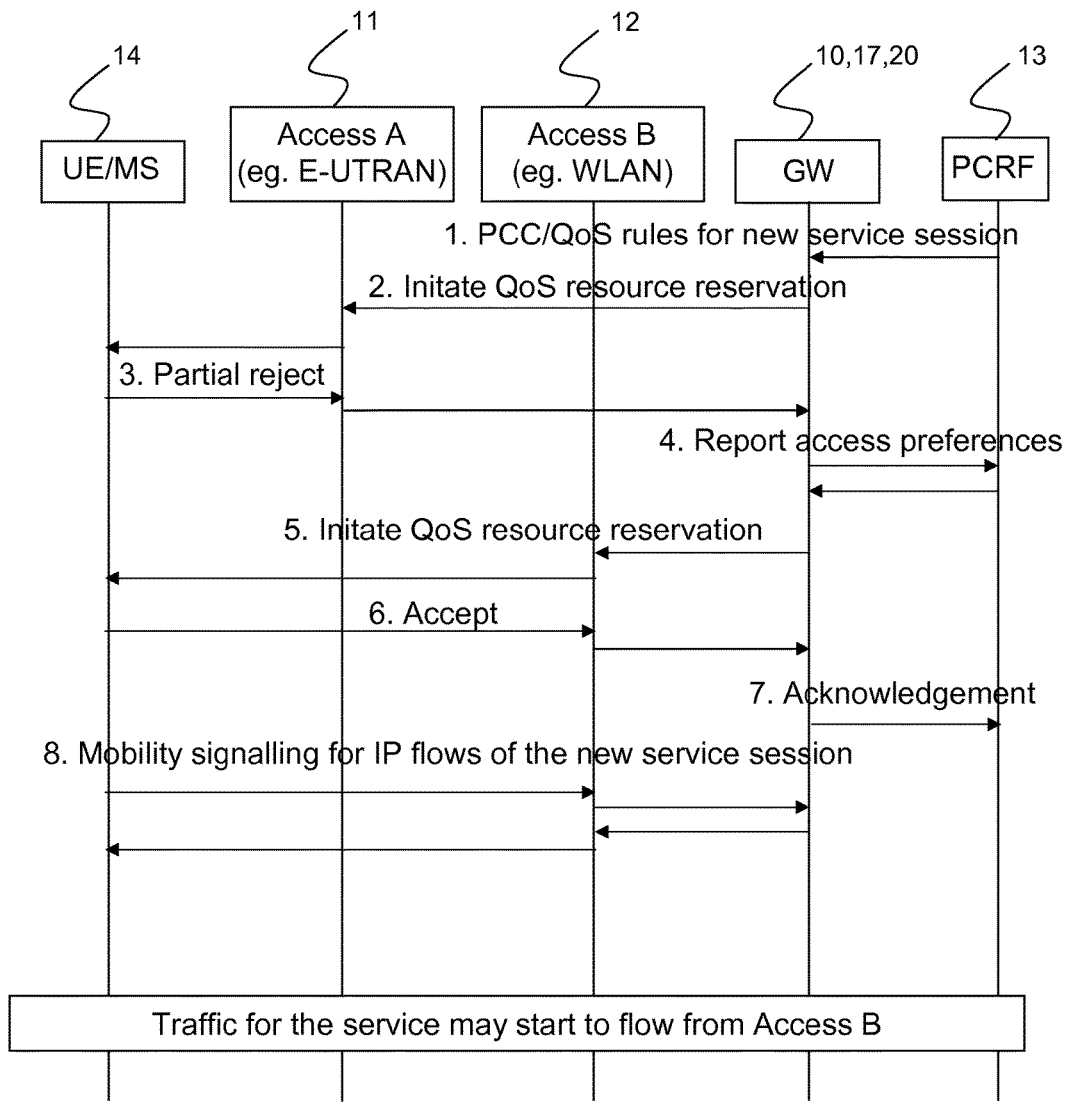
FIG. 3 illustrates a first example according to the present invention of a network signaling diagram for handover in a multi-access environment.

FIG. 3 illustrates a first example of a network signaling diagram for handover in a multi-access environment. In the example the UE 14 is assumed to have access to the same APN (Access Point Name) using at least two different access types that may be used to carry a certain service that requires dedicated resources. The UE has access selection policies, e.g. received from an Access Network Discovery and Selection Function (ANDSF). In the example, a new service session using network initiated QoS procedures is started. This particular service has access selection policies that indicate that Access B 12 has higher priority than Access A 11 for this type of service. We show an example call flow below for a scenario with on-path PCC (Policy and Charging Control):

These steps are performed, see FIG. 3:
1. Based on service information received over Rx (not shown in call flow), the PCRF 13 provides new PCC rules to the PDN-GW 10.
2. The PDN-GW 10 selects a first access 11 as present access (this is not really a selection since the default access has already been selected by the UE 14). The PDN-GW initiates the QoS procedures (in the present access) for the newly established service session.
3. The UE 14, e.g. based on access selection policies, rejects the requests and replies indicating which second access(es) should be used as present access instead.
4. The PDN-GW 10 reports the result back to the PCRF 13.
5. The PCRF 13 picks the second access 12 (Access B) with highest priority as indicated in the access information provided by the UE 14. The PDN-GW 10 initiates the QoS procedures in this access for the newly established service session.
6. The QoS procedures are successfully completed.
7. The PDN-GW 10 acknowledges the installation of the PCC rules to the PCRF 13.
8. In order to fully complete the service start the UE must also provide routing/mobility rules to the network (according to the UE-centric mobility paradigm). This step is independent of steps 5-6 and may e.g. take place simultaneously with 5-6. This reduces the total time from step 1 until traffic can start to flow in present access 12 (Access B).

The example above shows a network scenario with "on-path" PCC in both accesses. Similar call flows would apply also in case of "off-path" PCC. The key difference would be that the PCRF 13 performs QoS reservation by providing "QoS rules" directly to the Access GW in each access 11,12.

Figure 4:
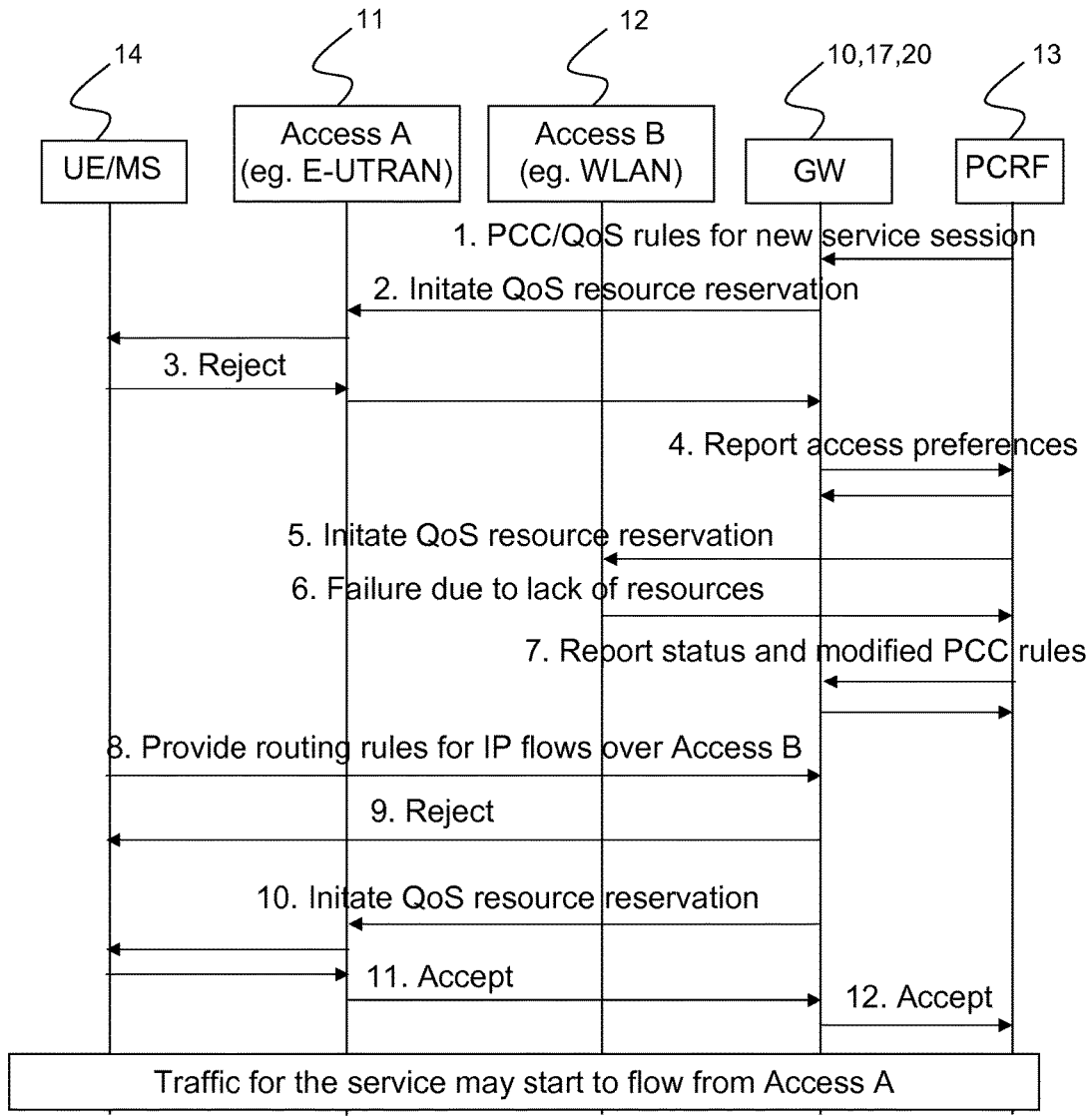
FIG. 4 illustrates a second example according to the present invention of a network signaling diagram for handover in a multi-access environment.

FIG. 4 illustrates a second example of a network signalling diagram for handover in a multi-access environment. In this example the QoS resource reservation in a second access indicated in the access information fails. The QoS resource reservation may then be performed in another second access indicated in the access information. When the QoS resource reservation in all second accesses indicated in the access information fails, a default access retrieved by the PDN-GW 10 is accepted by the UE 14 as present access.

These steps are performed, see FIG. 4:
1. Based on service information received over Rx (not shown in call flow), the PCRF 13 provides new PCC rules to the PDN-GW 10.
2. The PDN-GW 10 selects a first access 11 as present access (this is not really a selection since the default access has already been selected by the UE 14). The PDN-GW initiates the QoS procedures (in the present access) for the newly established service session.
3. The UE 14, e.g. based on access selection policies, rejects the requests and replies indicating which second access(es) should be used as present access instead.
4. The PDN-GW 10 reports the result back to the PCRF 13.
5. The PCRF 13 picks the second access 12 (Access B) with highest priority as indicated in the access information provided by the UE 14. The PCRF 13 initiates the QoS procedures in this access for the newly established service session.
6. The reservation fails due to lack of radio resources.
7. The PCRF 13 provides updated PCC rules to the PDN-GW 10 as needed. The PDN-GW replies to the PCRF 13.
8. The UE provides routing/mobility rules to the network (according to the UE-centric mobility paradigm). The UE is not aware of the fact that the reservation failed.
9. The PDN-GW 10 rejects the routing rules.
10. The PDN-GW 10 instead initiates QoS procedures in the first access for the newly established service session. This step may be the last step when the PDN-GW or PCRF 13 has tried and failed on all of the second accesses provided in the access information.
11. The UE 14, e.g. based on access selection policies, accepts the QoS resource requests and replies with an accept message.

The example above shows a network scenario with "on-path" PCC in access A and "off-path" PCC in access B. Similar call flows would apply also if "off-path" PCC would be used in Access A and/or "on-path" PCC would be used in Access B. The key difference for "off-path" PCC in Access A would be that the PCRF 13 performs QoS reservation by providing "QoS rules" directly to the Access GW in access 11. The key difference for "on-path" PCC in Access B would be the PCRF 13 performs QoS reservation by providing "PCC rules" to the PDN-GW 10, and the PDN-GW initiates QoS reservation procedure towards access 12.

In summary, the present invention provides the advantage that the PDN-GW 10 can ensure that QoS resources for an IP flow are established in the desired (present) access immediately, without going through the intermediate step of setting up the resources in a default access first and then let the UE trigger a movement of IP flow to the desired access.

The invention is not to be regarded as being limited to the examples described above. A number of additional variants and modifications are possible within the scope of the subsequent patent claims.

The invention claimed is:
1. A method for providing access feedback when a User Equipment, UE, with an established connection over multiple accesses towards a Gateway, GW, initiates a set-up of a new service for a service session, comprising:
the GW or a Policy and Charging Rules Function, PCRF, initiating a Quality of Service, QoS, resource reservation as a response of the set-up of the new service initiated by the UE, the GW or the PCRF in the QoS resource reservation selecting a first access as a present access;
the GW receiving a rejection message from the UE, the rejection message including access preference information;

the GW forwarding the access preference information to the PCRF;

the GW receiving a second access as the present access selected by the PCRF in accordance with the access preference information; and the GW or the PCRF initiating a new QoS resource reservation for the second access.

2. The method according to claim 1, wherein, when the UE accepts said second access as the present access and sends an accept message to the GW, the GW or the PCRF, as a result of the accept message, proceeds with the initiated QoS resource reservation over the selected and accepted access.

3. The method according to claim 2, wherein the UE as a result of the accept initiates a flow mobility procedure by sending a IP flow mobility message to the GW for the established service or IP session flow via the selected, present access.

4. The method according to claim 1, wherein the UE is informed about the first access selected in an access selection message in the QoS resource reservation.

5. The method according to claim 4, wherein the access selection message comprises allowance information indicating the capability of the GW or the PCRF to receive a reject message.

6. The method according to claim 1, wherein the access presence information in the reject message comprises access information indicating at least one second access that is selectable by the PCRF as the present access.

7. The method according to claim 6, wherein the access information comprises a list of the at least one second access, said list being sorted in priority order.

8. The method according to claim 6, wherein the reject message further comprises information about the reason for the reject of the first access as the present access.

9. The method according to claim 6, wherein, when the QoS resource reservation in a second access indicated in the access information fails, a QoS resource reservation is performed in another second access indicated in the access information.

10. The method according to claim 6, wherein, when the QoS resource reservation in all second accesses indicated in the access information fails, a default access retrieved by the GW is accepted by the UE as the present access.

11. A User Equipment, UE, with an established connection over multiple accesses, being adapted for providing access feedback to a GW when the UE initiates a set-up of a new service for a service session, wherein the UE is configured to reject a selected first access as a present access and send a reject message to a GW, the reject message including access preference information, the first access being selected in a Quality of Service, QoS, resource reservation initiated by the GW or a Policy and Charging Rules Function, PCRF as a response of a service session initiated by the UE.

12. A Gateway, GW, configured to initiate a Quality of Service, QoS, resource reservation as a response of the set-up of a new service initiated by a User Equipment (UE), with an established connection over multiple accesses, the GW comprising:

a memory; and a processor coupled to the memory, the processor configured to:

initiate a Quality of Service, QoS, resource reservation as a response of the set-up of the new service initiated by the UE, the GW or the PCRF in the QoS resource reservation selecting a first access as a present access, receive a rejection message from the UE, the rejection message including access preference information, forward the access preference information to the PCRF, receive a second access as the present access selected by the PCRF in accordance with the access preference information, and initiate a new QoS resource reservation for the second access.

13. A Policy and Charging Rules Function, PCRF, configured to initiate a Quality of Service, QoS, resource reservation as a response of the set-up of a new service initiated by a User Equipment (UE), with an established connection over multiple accesses and configured to reject a selected first access as a present access, the first access being selected in a Quality of Service, QoS, resource reservation initiated by the (PCRF) as a response of a service session initiated by the UE, the PCRF in the QoS resource reservation configured to select an access as the present access, wherein the PCRF further being configured to:

receive access preference information included in a rejection message that rejects the first access as the present access, select a second access as the present access in accordance with the access preference information, and to initiate a new QoS resource reservation as a result of the reject message sent by the UE and select a second access as the present access.

* * * * *